(12) United States Patent
Nicol et al.

(10) Patent No.: US 7,639,995 B2
(45) Date of Patent: Dec. 29, 2009

(54) RECONFIGURABLE COMMUNICATIONS CIRCUIT OPERABLE WITH DATA CHANNEL AND CONTROL CHANNEL

(75) Inventors: Christopher John Nicol, New South Wales (AU); Dominic Wing-Kin Yip, New South Wales (AU)

(73) Assignee: Agere Systems Inc., Allentown, PA (US)

( * ) Notice: Subject to any disclaimer, the term of this patent is extended or adjusted under 35 U.S.C. 154(b) by 734 days.

(21) Appl. No.: 11/166,042

(22) Filed: Jun. 24, 2005

(65) Prior Publication Data

US 2006/0291501 A1 Dec. 28, 2006

(51) Int. Cl.
*H04B 1/16* (2006.01)
(52) U.S. Cl. .................... 455/130; 455/140; 455/343.2; 455/574; 370/311
(58) Field of Classification Search ................. 370/335, 370/342, 437, 450, 454, 456, 459, 479–480, 370/488, 311; 375/229, 269, 324–329; 455/132–140, 455/552.1, 343.1–343.4, 52, 572, 574
See application file for complete search history.

(56) References Cited

U.S. PATENT DOCUMENTS 6,865,232 B1 * 3/2005 Isaksson et al. ............. 375/260
2002/0173312 A1 * 11/2002 Takano et al. ............... 455/452
2005/0078640 A1 * 4/2005 Kim et al. .................... 370/335
2005/0272459 A1 * 12/2005 Lee et al. ..................... 455/522
2006/0014505 A1 * 1/2006 Hiraki ......................... 455/132
2006/0039330 A1 * 2/2006 Hackett et al. .............. 370/335
2006/0227886 A1 * 10/2006 Li et al. ....................... 375/260

OTHER PUBLICATIONS

Nicol et al., "Reconfigurable Communications Circuit," U.S. Appl. No. 11/107,049, filed Apr. 15, 2005.
Santoso et al., "A Chip level Decision Feedback Equalizer for CDMA Downlink Channel with the Alamouti Transmit Diversity Scheme," The 14th IEEE International Symposium on Personal, Indoor and Mobile Radio Communication Proceedings, pp. 1322-1326 (2003).
Alamouti, S.M., "A Simple Transmit Diversity Technique for Wireless Communications," IEEE Journal on Select Areas in Communications, vol. 16, No. 8, pp. 1451-1458, (Oct. 1998).

(Continued)

*Primary Examiner*—Simon D Nguyen
(74) *Attorney, Agent, or Firm*—Ryan, Mason & Lewis, LLP

(57) ABSTRACT

A communications circuit can operate with a data channel and a control channel. A changeable portion of the circuit can be reconfigurable between a first mode associated with activity on the control channel only and a second mode associated with activity on both the data channel and the control channel. The first mode can be selected to reduce power consumption compared to the second mode. Controller circuitry is provided to sense signals associated with the control channel and to switch the changeable portion between the first and second modes.

21 Claims, 7 Drawing Sheets

OTHER PUBLICATIONS

Lenardi, et al., "Comparison of Downlink Transmit Diversity Schemes for RAKE and SINR Maximizing Receivers," IEEE ICC 2001 Conference Proceedings (2001).

Frank, C.D., "MMSE Reception of DS-CDMA with Open-Loop Transmit Diversity," 3G Mobile Communication Technologies Conference Publication No. 477, pp. 156-160, (Mar. 2001).

Hooli, K., "Equalization in WCDMA Terminals," Oulu University Press, Oulu (2003).

Anonymous, "3rd Generation Partnership Project; Technical Specification Group Radio Access Network; Spreading and modulation (FDD), 3GPP TS 25.213, V5.5.0" (Dec. 2003).

Anonymous, "3rd Generation Partnership Project; Technical Specification Group Radio Access Network; Physical channels and mapping of transport channels onto physical channels (FDD), 3GPP TS 25.211, V5.6.0" (Sep. 2004).

* cited by examiner

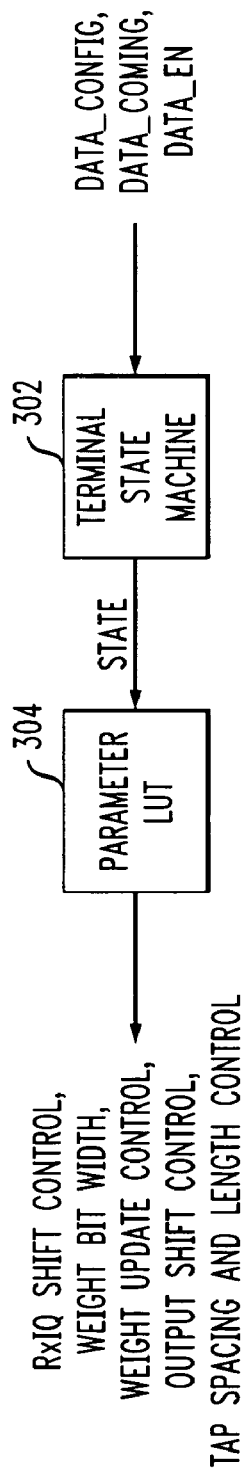

FIG. 3

RxIQ SHIFT CONTROL,
WEIGHT BIT WIDTH,
WEIGHT UPDATE CONTROL,
OUTPUT SHIFT CONTROL,
TAP SPACING AND LENGTH CONTROL

302 — TERMINAL STATE MACHINE

DATA_CONFIG, DATA_COMING, DATA_EN

304 — PARAMETER LUT

STATE

FIG. 4

| STATE | RxIQ SHIFT CONTROL | WEIGHT BIT WIDTH | WEIGHT UPDATE CONTROL | TAP LENGTH | TAP SPACING | OUTPUT SHIFT CONTROL |
|---|---|---|---|---|---|---|
| RX_CONTROL | 1 | 12 | 4 CHIPS PER UPDATE | 8 CHIPS | T | 5 |
| RX_DATA_QPSK | 0 | 15 | 1 CHIP PER UPDATE | 8 CHIPS | T/2 | 1 |
| RX_DATA_16QAM | 0 | 16 | 1 CHIP PER UPDATE | 8 CHIPS | T/2 | 0 |

RECONFIGURABLE COMMUNICATIONS CIRCUIT OPERABLE WITH DATA CHANNEL AND CONTROL CHANNEL

FIELD OF THE INVENTION

The present invention relates generally to communications circuits, and more particularly relates to a circuit that is operable with a data channel and a control channel.

BACKGROUND OF THE INVENTION

Communications circuits such as receivers may be employed under conditions where there is a limited supply of power, such as, for example, in a mobile handset. In such cases, it is important that the circuit, such as a receiver circuit, consumes minimum power at times when the user does not need to receive data from a base station. In many modern telecommunications systems, such as, for example, that specified in the Third Generation Partnership Project (3GPP) Universal Mobile Telecommunications System (UMTS) Technical Specification (TS) 25.211, there are pairs of physical channels. Each pair includes a data channel having user data for the receiver, and a control channel having signaling information related to the data channel.

Typically, the receiver always receives the control channel to ascertain current or imminent transmission on the data channel. The receiver may, for example, be engaging in high-speed data reception per the 3GPP High-Speed Downlink Packet Access (HSDPA) specification. Components, such as filters, despreaders, and/or demappers usually consume the same power regardless of whether or not the data channel is being received. One common type of filter for high-speed applications is a linear transversal equalizer filter selected for simplicity and ability to mitigate inter-symbol interference.

Accordingly, it would be desirable to provide a reconfigurable communications circuit for use with a control channel and a data channel where power consumption can be reduced under conditions when the data channel does not need to be received.

SUMMARY OF THE INVENTION

The present invention, in an illustrative embodiment, addresses the needs identified in the prior art. In one aspect, an exemplary communications circuit operable with a data channel and a control channel includes a changeable portion and controller circuitry. The changeable portion is reconfigurable between a first mode that is associated with activity on the control channel only, and a second mode that is associated with activity on both the data channel and the control channel. The first mode is selected for reduced power consumption as compared to the second mode. The controller circuitry is coupled to the changeable portion and is configured to sense signals associated with the control channel so as to determine an appropriate configuration of the changeable portion corresponding to the first or second mode. Further, the controller circuitry is configured to switch the changeable portion between the first and second modes.

In another aspect, an exemplary method of operating a communications circuit can include the steps of operating the circuit in a first mode wherein activity is limited to a control channel, and where a changeable portion of the circuit is configured for reduced power consumption as compared to a second mode; obtaining a signal from the control channel that is indicative of activity associated with the data channel; and, responsive to obtaining the signal, reconfiguring the changeable portion of the circuit into the second mode. The second mode is associated with activity on both the data channel and the control channel.

A more complete understanding of the present invention, as well as further features and advantages of the present invention, will be obtained by reference to the following detailed description and drawings.

BRIEF DESCRIPTION OF THE DRAWINGS

FIG. 3 is a block diagram showing one possible manner in which an equalizer control can be implemented in accordance with techniques of the present invention;

FIG. 4 is a table showing an exemplary implementation of a parameter look-up table in accordance with an aspect of the present invention;

DETAILED DESCRIPTION

Figure 1:
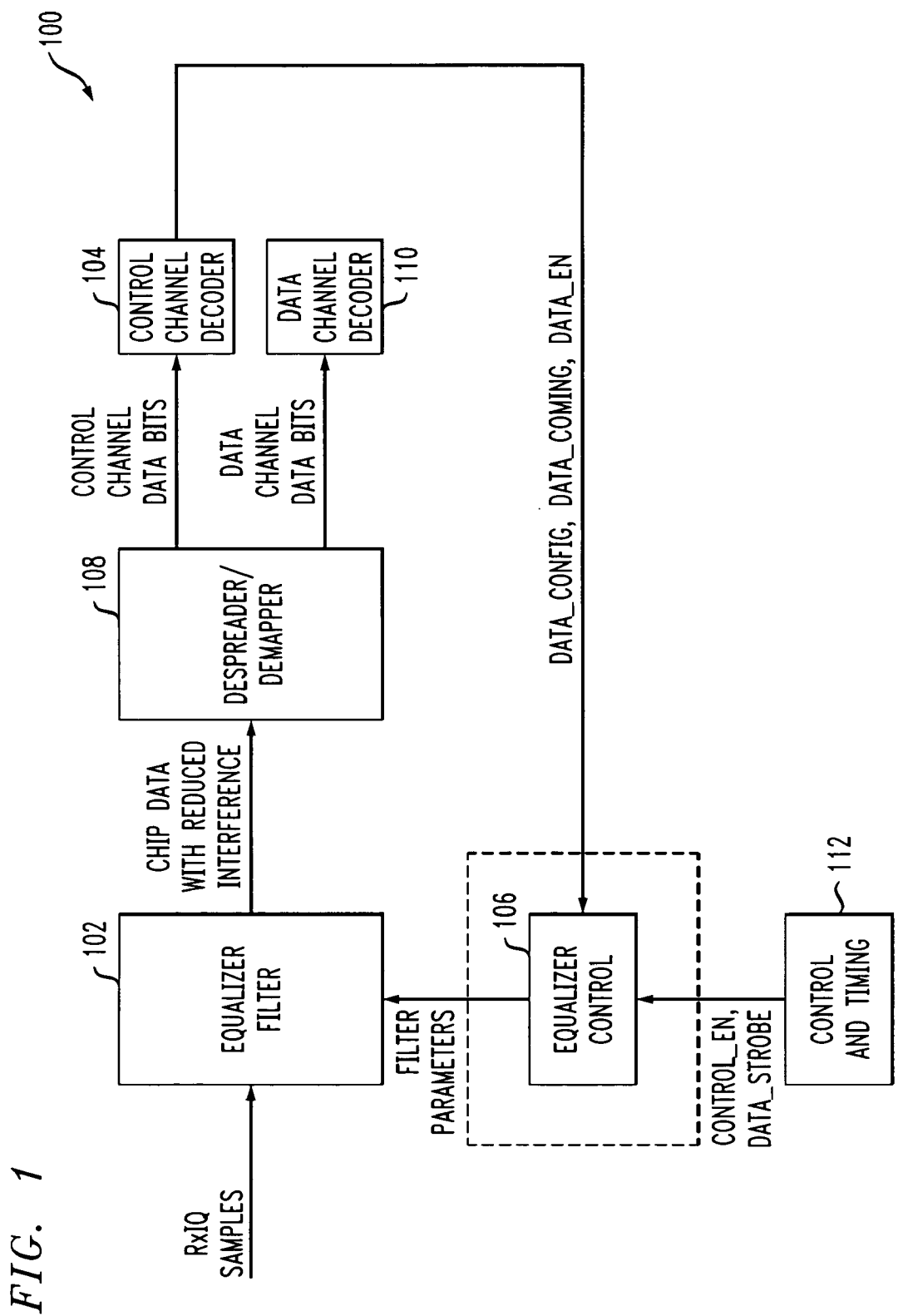
FIG. 1 is a block diagram depicting an exemplary embodiment of a communications circuit in accordance with an aspect of the present invention.

Reference should now be had to FIG. 1, which depicts an exemplary communications circuit 100 in accordance with one aspect of the present invention. Circuit 100 is operable with a data channel and a control channel, and includes a changeable portion reconfigurable between a first mode and a second mode, and controller circuitry that is coupled to the changeable portion. In one or more exemplary embodiments of the invention, the data channel can be a High Speed Physical Data Shared Channel (HS-PDSCH) and the control channel can be a High Speed Shared Control Channel (HS-SCCH); in some embodiments, the data channel can be a Secondary Common Control Physical Channel (SCCPCH) containing a Paging Channel (PCH) and the control channel can be a Paging Indicator Channel (PICH). The aforementioned channels are specified by the 3GPP in TS 25.211, and are mentioned by way of example and not limitation.

In the exemplary embodiment shown in FIG. 1, the changeable portion can be, for example, equalizer filter 102. The changeable portion, such as filter 102, can be reconfigurable between a first mode associated with activity on the control channel only and a second mode that is associated with activity on both the data channel and the control channel. The first mode can be selected for reduced power consumption compared to the second mode. The controller circuitry can be coupled to the changeable portion and can be configured to sense signals associated with the control channel in order to determine an appropriate configuration of the changeable portion that corresponds to one of the first and second modes. Further, the controller circuitry can be configured to switch the changeable portion between the first and the second modes.

In the exemplary embodiment of FIG. 1, the controller circuitry can include a control channel module such as control channel decoder 104 that is configured to sense signals associated with the control channel so as to determine the appropriate configuration of the changeable portion corresponding to one of the first and second modes. The controller circuitry can also include a changeable portion controller such as the equalizer control 106 as depicted in the exemplary embodiment of FIG. 1. The changeable portion controller can be coupled to the changeable portion and the control channel module and can be configured to switch the changeable portion between the first and second modes responsive to input from the control channel module.

It will be appreciated that the exemplary communications circuit of FIG. 1 is a receiver circuit. An appropriate signal, such as digitized baseband samples (for example, Receiver In-Phase and Quadrature (RxIQ) samples) are fed into the equalizer filter block 102. Note that the RxIQ samples shown in FIG. 1 can be supplied in any appropriate manner; one possible manner is via an antenna module to be discussed below in connection with FIG. 2. Parameters of the equalizer filter 102 are controlled by the equalizer control block 106. The output of filter 102 is received chip data with reduced interference; such output can be fed into despreader/demapper 108. Note that a "chip," in this context, is intended to encompass a data symbol multiplied by, for example, a spreading code when using, for example, Code Division Multiple Access (CDMA). In cases where standards such as the 3GPP UMTS TS 25.211 are used, the chip may have further been multiplied with a complex scrambling code, as described in 3GPP standard 25.213.

Despreader/demapper 108 can include a despreader that correlates the chip data with spreading codes of the control and data channels to produce data symbols. The despreader/demapper 108 can also include a demapper that extracts data bits from the symbols. Control channel data bits can be fed to control channel decoder 104, which decodes information pertaining to the status of the data channel. Once at least a portion of the signal on the control channel is received, the control channel decoder 104 would typically be able to determine whether the data channel will need to be received in a future time. For example, if the data channel will need to be active in the coming time frame, the "data_coming" signal can be sent from control channel decoder 104 to equalizer control 106.

In some cases the data channel may have one or more configurations. In such a case, the changeable portion can be further reconfigurable, for example, between the first mode, the second mode, a third mode, and a fourth mode. The second mode could correspond, e.g., to activity on the control and data channels according to a quadrature phase shift keying (QPSK) scheme, the third mode could correspond, e.g., to activity on the control channel according to a quadrature phase shift keying (QPSK) scheme and activity on the data channel according to 16-ary quadrature amplitude modulation (16QAM), and the fourth mode could correspond, e.g., to an idle state. QPSK could also be used for the control channel only (first) mode (for example, in HS-SCCH), or, in other applications, such as PICH, binary phase shift keying (BPSK) could be used for the control channel. The control channel module such as control channel decoder 104 could be configured to determine the appropriate configuration of the data channel and/or to anticipate which mode will be required in a future time. A signal indicative of the configuration, for example, "data_config," can be sent from the control channel decoder 104 to the equalizer control 106.

Further, the control channel decoder 104 can determine (typically, after passage of additional time) whether the data channel is valid. Such validity determination can be based on, for example, a cyclic redundancy check (CRC) of the control channel. The result can be sent from the control channel decoder 104 to the equalizer control 106, for example, in the form of the "data_en" signal. When it is required or desired to receive data over the data channel, the data channel bits output from the despreader/demapper 108 can be routed to data channel decoder 110.

Control and timing logic 112 can also be provided. Control and timing block or module 112 can, for example, generate enable signals and timing strobes for the equalizer control logic 106 (such signals and strobes can include the "control_en" and "data_strobe" signals indicative of the end of a data channel frame).

Throughout the specification and claims of the present application, one or more elements may be referred to as being "coupled" or "interconnected." Such coupling or interconnection can also be indicated in the drawing figures by arrows showing, for example, flow of data or signals between various blocks or elements. As used herein, including the claims, "coupled" or "interconnected" is intended to encompass both direct and indirect (i.e., through one or more other elements or components) coupling or interconnection. Where elements are formed on an integrated circuit chip, such coupling or interconnection can simply include appropriate physical paths formed on the chip. Where other elements are employed, appropriate discrete connections can be utilized.

Figure 2:
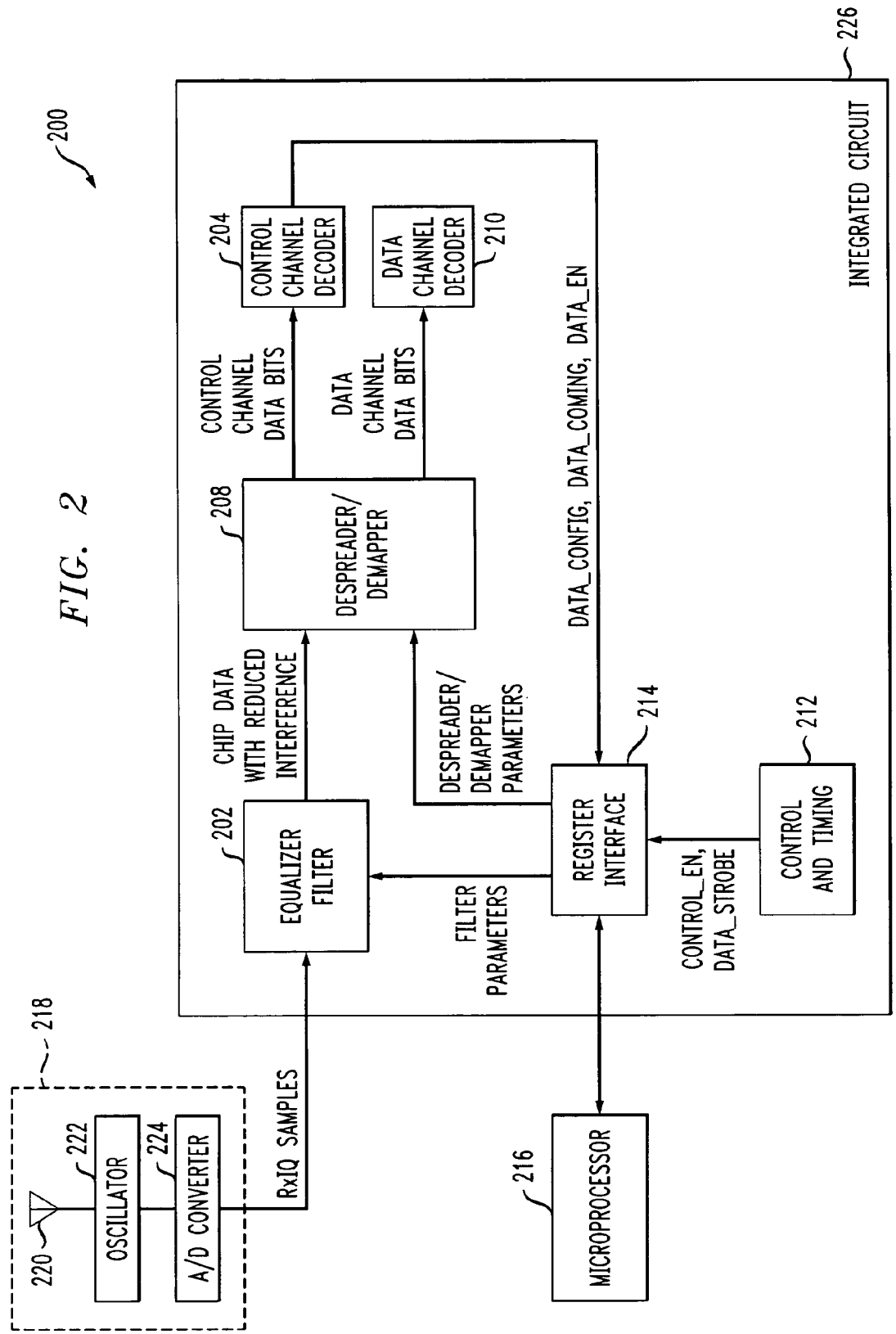
FIG. 2 is a block diagram showing another exemplary embodiment of a communications circuit in accordance with another aspect of the present invention.

Attention should now be given to FIG. 2, which shows one exemplary manner in which an apparatus according to the present invention can be implemented. Elements similar to those in FIG. 1 will receive the same reference character incremented by 100 and will not be separately discussed. The apparatus 200 shown in FIG. 2 can be implemented, at least in part, by means of an integrated circuit 226. One or both of equalizer filter 202 and despreader/demapper 208 can correspond to the changeable portion discussed above. A changeable portion control interface, such as register interface 214, can be provided and can be coupled to the changeable portion (for example, either or both of filter 202 and despreader/demapper 208) and can also be configured to interface with a processor. The processor can be, for example, microprocessor 216, or any of a number of other types of suitable processors such as a microcontroller or a digital signal processor (DSP).

The register interface 214 can contain configuration registers with appropriate filter parameters and despreader/demapper parameters, as well as status registers having the values of the data_config, data_coming, and data_en parameters. Software implementing appropriate logic, as will be discussed below with respect to FIG. 3, can run on a processor such as microprocessor 216. Periodically, processor 216 can read the status registers in the register interface, and can write appropriate filter and despreader/demapper parameters into the control registers in the register interface 214.

In the exemplary embodiment shown in FIG. 2, the processor 216 is external to the integrated circuit 226. Processor 216 could also be formed on integrated circuit 226, for example, forming an equalizer controller in conjunction with register interface 214. When microprocessor 216 is external, it can be thought of as a workpiece rather than as a part of a claimed integrated circuit. A claim to an integrated circuit operable with an external processor in intended to cover a structure that does not include such processor, but such claimed integrated circuit may include a register interface 214 configured to interface with such external processor.

The RxIQ samples, or other digitized baseband samples or general input, can be provided via antenna module 218, which in the example shown in FIG. 2, includes antenna 220, oscillator 222, and analog-to-digital converter 224. It will be appreciated that an antenna module can include an antenna and any appropriate downconversion circuitry for receiving radio frequency (RF) transmissions and transforming such received signals to baseband signals. Downconversion may typically involve an oscillator 222 generating a waveform having a frequency identical to the carrier frequency. Such waveform will typically be shifted and multiplied with the output of antenna 220 to generate in-phase and quadrature outputs. These outputs may then be filtered to remove undesirable out-of-band frequency components. While modem receivers may typically not use intermediate stages producing intermediate frequency (IF) signals, use of such stages with one or more exemplary embodiments of the present invention is believed possible.

Turning now to FIG. 3, control circuitry such as the aforementioned equalizer control can be implemented, for example, as depicted therein. In particular, an equalizer control can include a terminal state machine 302 and a parameter determination module such as a parameter look-up table 304. The terminal state machine 302 can be configured to determine an appropriate one of the modes for the changeable portion, such as the equalizer filter, responsive to input from the control channel decoder. The parameter determination module can be configured to generate filter parameters (or other types of parameters needed by other types of changeable portions) for the equalizer filter, responsive to information that is indicative of the appropriate state and that is received from the terminal state machine 302. When the parameter determination module is implemented as parameter look-up table 304, such table can include appropriate values of parameters that are indicative of sample chip control, weight bit width, weight control update, tap length, tap spacing, and output chip control corresponding to the appropriate operating mode.

In the example of FIG. 3, there are four possible operation states: idle, where the entire equalizer should be disabled; rx_control, where the equalizer is to receive the control channel only; rx_data_QPSK, where the equalizer is to receive both the control and data channels using QPSK modulation, or will be receiving the data channel using such modulation in the coming data channel time-frame; and rx_data_16QAM. In the later case, the equalizer is receiving the control channel in QPSK modulation and the data channel in 16 QAM modulation, or will be receiving the data channel in 16 QAM modulation in the coming data channel time-frame. The data_config, data_coming, and data_en parameters from the control channel decoder are fed into terminal state machine 302, which determines which of the aforementioned operating states is appropriate. The state is then supplied to the parameter look-up table 304, which generates appropriate filter parameters for the equalizer filter.

FIG. 4 shows one possible implementation of a parameter look-up table suitable for use with the configuration depicted in FIG. 3; the values of the parameter determination module outputs are listed for the three active control channel decoder parameters.

Figure 5:
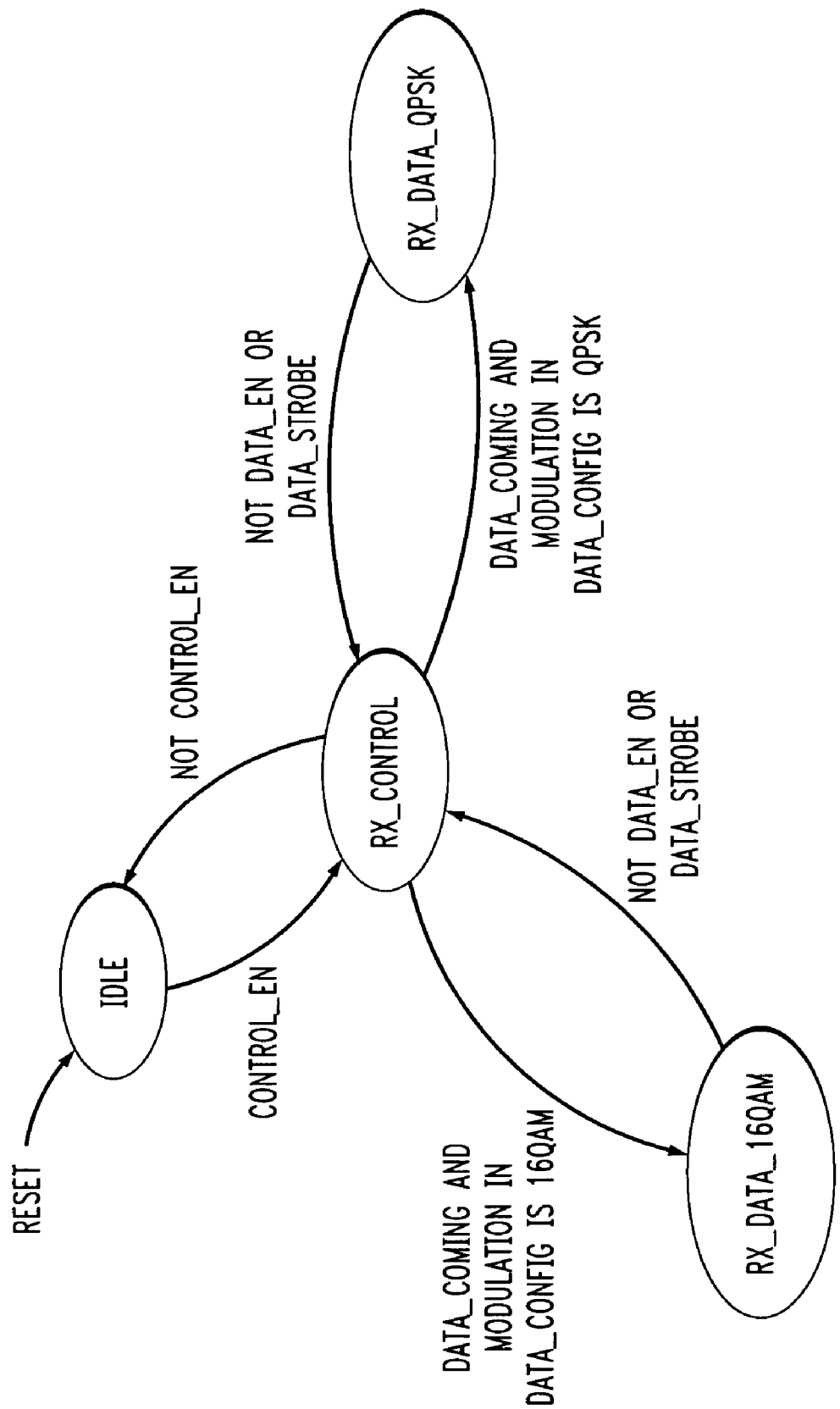
FIG. 5 is a state diagram for a terminal state machine for equalizer control in accordance with an aspect of the present invention.

FIG. 5 is a self-explanatory diagram illustrating implementation of the exemplary terminal state machine discussed above with regard to FIG. 3.

Figure 6:
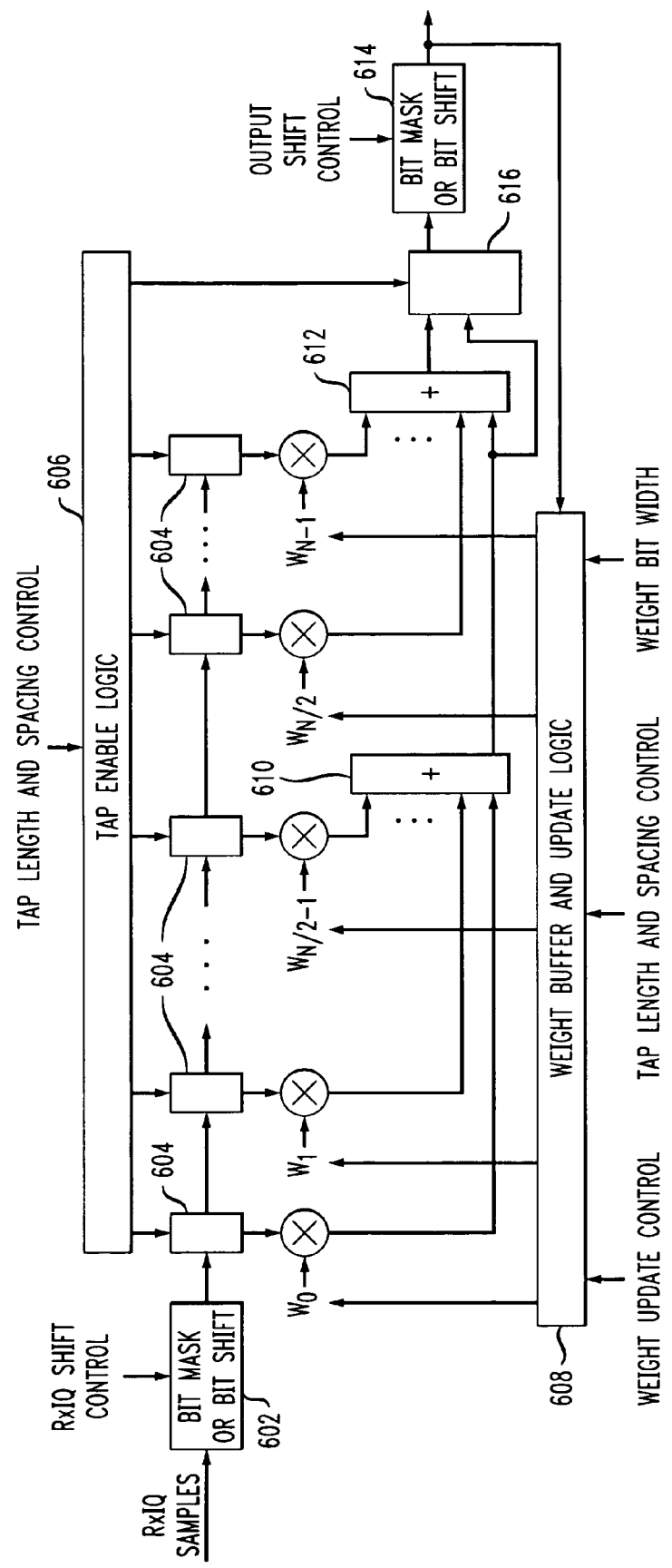
FIG. 6 shows an exemplary implementation of an equalizer filter in accordance with an aspect of the present invention.

FIG. 6 shows an exemplary implementation of a reconfigurable equalizer filter. The exemplary filter can include sample bit logic such as the bit mask or bit shift block 602 that is configured to receive the baseband samples as well as a parameter indicative of sample shift control. The parameter can be, for example, the RxIQ shift control parameter received from the parameter determination module such as the above-discussed parameter look-up table. Block 602 can mask a number of least significant bits in the RxIQ samples to zero according to the RxIQ shift control parameter. Alternatively, the RxIQ samples can be right-shifted according to the RxIQ shift control, with a sign bit shifted in from the left (assuming a two's complement representation of the RxIQ samples). The samples, possibly with reduced bit width, can then be fed into an equalizer delay line formed by weighted taps 604, each having a tap weight, $w_0, w_1 \ldots, w_{N/2-1}, w_{N/2}, \ldots w_{N-1}$. The equalizer delay line will have an input coupled to the sample bit logic 602, suggested by the arrow interconnecting block 602 and the first tap 604. Propagation through the equalizer delay line can be under the control of tap enable logic 606 coupled to the taps 604 of the equalizer delay line and configured to receive parameters indicative of tap length and tap spacing from the parameter determination module such as the above-discussed parameter look-up table. The samples in the delay line can be multiplied with the aforementioned equalizer weights obtained from weight buffer and update logic 608 which can be coupled to the taps of the equalizer delay line and configured to receive parameters indicative of weight bit width, weight control update, tap length, and tap spacing from the parameter determination module such as the parameter look-up table 304.

A first adder 610 can be coupled to a first portion of the taps 604 and a second adder 612 can be coupled to a second portion of the taps 604. The first portion can be, for example, the first N/2 taps, where N is the total number of taps in the delay line. The products from the first portion of taps can be added together by the first adder 610, while products from the second N/2 taps can be added by the second adder 612. Output bit logic, such as bit mask or bit shift block 614, can be coupled to the weight buffer and update logic 608 and can be configured to receive a parameter indicative of output shift control from the parameter determination module, such as parameter look-up table 304. Block 614 can have an input that is selectively interconnected (i.e., which interconnection to employ can be selected) to the first and second adders 610, 612. In particular, a suitable device such as a multiplexer 616 can be provided such that output can appropriately be selected from the output of the first adder 610, the sum of the first adder 610 and the second adder 612, and/or another desirable selection. Block 614 can mask unnecessary least significant bits to zero according to the output shift control received from the equalizer control logic; the adder output could also be left-shifted via block 614 with zeroes shifted into least significant bits.

Output of block 614 can be fed back to the weight buffer and update logic 608 for updates of the weights. The equalizer control logic can control the weight update frequency in the weight buffer and update logic through appropriate weight update control signals. Furthermore, the equalizer control logic can control the weight distribution to the taps in the weight buffer and update logic by means of the tap length and spacing control. Thus the number of taps in the equalizer can effectively be controlled. In view of the foregoing discussion, it will be appreciated that the equalizer filter can be viewed as a delay line with a plurality of weighted taps, having an output, and being reconfigurable by adjusting the weights of the weighted taps and selecting appropriate ones of the weighted taps to be coupled to the output.

Figures 7, 8:
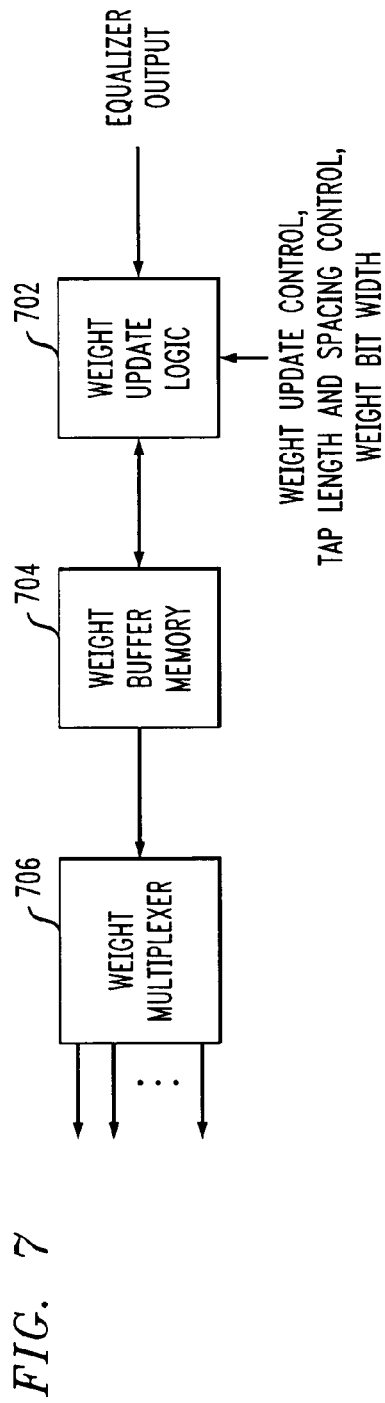
FIG. 7 shows an exemplary implementation of a weight buffer and update logic for an equalizer in accordance with an aspect of the present invention.
FIG. 8 is a table showing an implementation of tap enable logic for an 8-tap equalizer according to an aspect of the present invention.

Reference should now be had to FIG. 7, which depicts an exemplary implementation of the weight buffer and update logic for the equalizer filter. The exemplary implementation includes weight update logic 702 that is configured to receive parameters indicative of weight bit width, weight control update, tap length, and tap spacing, from the parameter determination module, and that is coupled to the output of the above-discussed output bit logic 614. The exemplary implementation of FIG. 7 can also include a weight buffer memory 704 that is coupled to the weight update logic 702 and configured to contain values of the tap weights. Further, the implementation of FIG. 7 can include a weight multiplexer 706 that is coupled to the weight buffer memory 704 and the above-discussed weighted taps and that is configured to distribute the tap weights to the taps. In one exemplary embodiment, the weight update logic 702 can implement the Normalized Least Mean Squares (NLMS) algorithm described in K. Hooli, "Equalization in WCDMA terminals," thesis in University of Oulu, Finland (2003), and can update the weights based on the equalizer output. The NLMS method is essentially the same as the well-known Least Mean Squares (LMS) approach, but a normalized step size is used. The step size is set to a stochastic estimate of the value that is known to give most rapid initial convergence. In the LMS method, a stochastic approximation to the gradient towards minimum error is employed.

The update rate, the number of weights to update, and the bit width of the weights can be controlled by the weight update control, tap length and spacing control, and weight bit width parameters from the equalizer control logic. When the tap spacing changes, the weights can be reset to 0; when the number of taps increases, the additional weights can be assumed to be 0. The equalizer weights can be stored in the weight buffer memory 704. In every chip period the weights can be read from the weight buffer memory 704 and distributed to the taps through the weight multiplexer 706.

Giving attention now to FIG. 8, the table therein shows exemplary timing of one possible implementation of the tap enable logic for an 8-tap equalizer filter. The tap enables can be generated according to the tap length and spacing control from the equalizer control logic. The exemplary table in FIG. 8 assumes that all of the taps are used, that is, that the tap length is 4 chips. In the event that the tap length is shorter, the number of taps enabled will accordingly be smaller. For example, if the tap length is 3 chips and the tap spacing is T/2, then only the enables to the first 6 taps are asserted every ½ chip. Accordingly, the taps can have a first spacing of T/2 and a second spacing of T, and the tap enable logic can be configured to specify which of the taps are to be enabled and when the enabling is to be asserted, for the first and second tap spacings, when transitioning from the first to second spacing, and when transitioning from the second to the first spacing.

Figure 9:
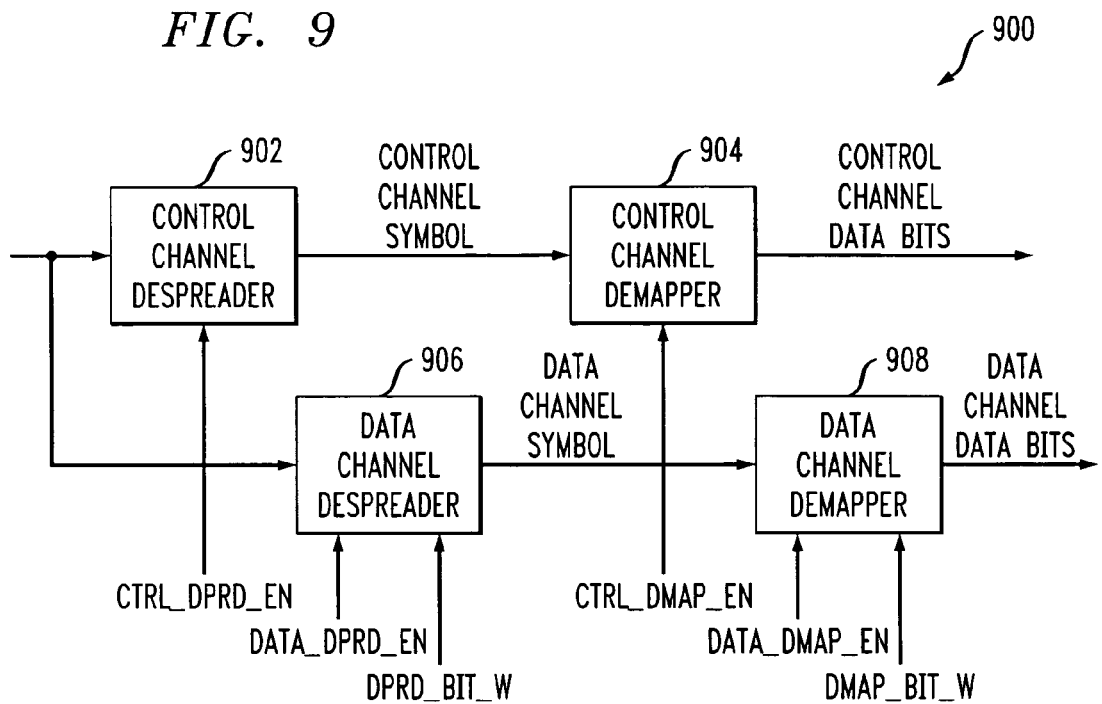
FIG. 9 is a block diagram of a reconfigurable despreader/demapper in accordance with an aspect of the present invention.

The changeable portion of a circuit in accordance with the present invention can, in some exemplary embodiments, include at least one of a despreader and a demapper. Referring now to FIG. 9, an exemplary reconfigurable despreader/demapper 900 includes a control channel despreader 902 configured to be operable in the first and second modes and a control channel demapper 904 that is also configured to be operable in the first and second modes and that is coupled to the control channel despreader 902 and the controller circuitry such as the control channel module discussed above. Despreader/demapper 900 can also include a data channel despreader 906 that is configured to be operable in the second mode and idle in the first mode discussed above, and a data channel demapper 908 that is also configured to be operable in the second mode and idle in the first mode discussed above, and that is coupled to the data channel despreader 906. Each of elements 902, 904, 906, 908 can be coupled to the changeable portion controller. Thus, the control channel despreader and demapper 902, 904 can be enabled when the control channel is received, and when the controller detects that activity on the data channel is anticipated, the data channel despreader and demapper 906, 908 can also be enabled. Further, depending on the type of modulation used in the data channel, the controller can choose appropriate bit widths for the data channel despreader and demapper and can configure them using the signals dprd_bit_w and dmap_bit_w. It will be appreciated that despreader/demapper 900 can be operable in more than two modes, for example, there can be an idle mode as discussed above and several different modes where the data channel is active, again, as discussed above.

Figure 10:
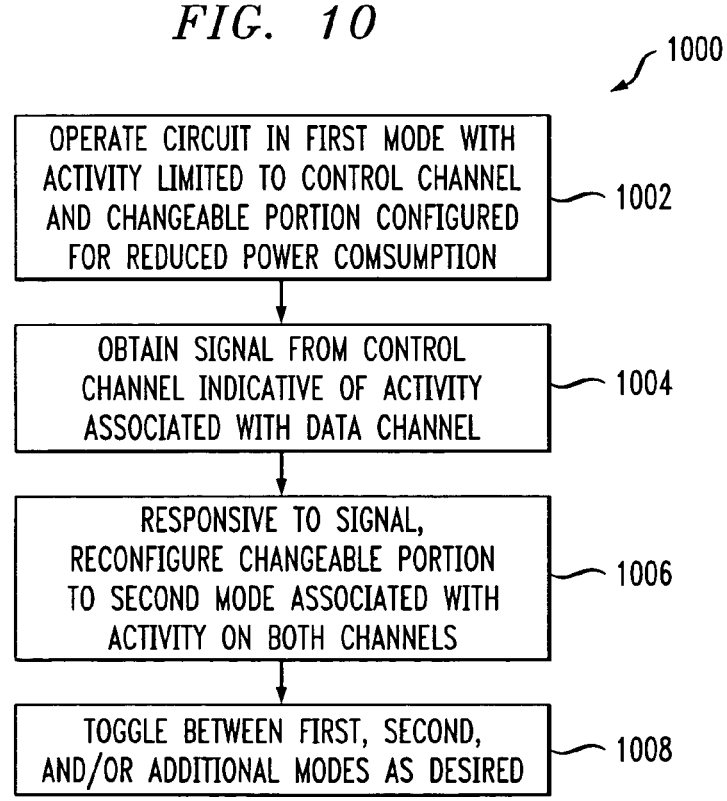
FIG. 10 is a flow chart of an exemplary method of operating a communications circuit according to an aspect of the present invention.

Finally turning to FIG. 10, a flowchart 1000 is presented depicting exemplary method steps for operating a communications circuit in accordance with aspects of the present invention. The method can include the step 1002 of operating the circuit in a first mode wherein activity is limited to a control channel and a changeable portion of the circuit is configured for reduced power consumption as compared to a second mode. Further, the method can include the step 1004 of obtaining a signal from the control channel that is indicative of activity associated with the data channel. Method 1000 can further include the step 1006 of reconfiguring the changeable portion of the circuit into the second mode, responsive to obtaining the signal from the control channel. The second mode can be associated with activity on both the data channel and the control channel. Where desired, one can toggle between the first and second modes, and/or between additional modes, as desired, as indicated at block 1008. Such modes can include, for example, the four operating states of the exemplary embodiment discussed above with respect to FIG. 3.

One or more exemplary embodiments of the present invention can be employed to reduce the power consumption of receivers when only control channel information is being received. In some cases, this may result in the sacrifice of interference cancellation capability, without performance degradation when the data channel is actually being received. Where such reduction in interference cancellation occurs, it is likely to have no significant impact on the overall bit error rate in receiving the control signal, as spreading factors for control channels are typically higher and the modulation of control channels is often QPSK. By way of example, the spreading factor for the HS-SCCH is 128 and its modulation is QPSK, while the spreading factor for the HS-PDSCH is 16 and the modulation can be either be QPSK or 16QAM. Further, the spreading factor for PICH is 256 and the modulation is BPSK, while the spreading factor for SCCPCH can be down as low as 4 and the modulation is QPSK. Thus, in one or more exemplary embodiments of the present invention, overall dynamic power consumption of a changeable portion, such as an equalizer, can be significantly decreased with only a small increase in required control logic, and the changeable portion, such as the equalizer, can be designed so as to only be fully "on" on when the data channel is to be received. This can result in battery life extension for mobile handsets, and other exemplary applications of the present invention.

At least a portion of the techniques of the present invention described herein may be implemented in an integrated circuit. In forming integrated circuits, a plurality of identical die are typically fabricated in a repeated pattern on a surface on a semiconductor wafer. Each die can include an entire circuit or elements as described herein, and can include other structures or circuits. The individual die are cut or diced from the wafer and then packaged as an integrated circuit. One skilled in the art will know how to dice wafers and package die to produce integrated circuits. Integrated circuits so manufactured are considered part of this invention. Furthermore, when a "chip" is being referred to, it will be apparent from the context whether a multiplied data symbol or an integrated circuit structure is being referred to.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

We claim:

1. A communication circuit operable with a data channel and a control channel, said communication circuit comprising:
    a changeable portion reconfigurable between a first mode associated with activity on the control channel only and a second mode associated with activity on both the data channel and the control channel, said first mode being selected for reduced power consumption compared to said second mode; and
    controller circuitry coupled to said changeable portion and configured to: (i) sense signals associated with the control channel to determine an appropriate configuration of said changeable portion corresponding to one of said first and second modes, and (ii) switch said changeable portion between said first and second modes;
    wherein:
    said controller circuitry comprises:
        a control channel module configured to sense the signals associated with the control channel to determine said appropriate configuration of said changeable portion corresponding to said one of said first and second modes; and
        a changeable portion controller coupled to said changeable portion and said control channel module, said changeable portion controller being configured to switch said changeable portion between said first and second modes responsive to input from said control channel module;
    said communication circuit comprises a receiver circuit;
    said changeable portion comprises an equalizer filter, and
    said changeable portion controller comprises an equalizer control;
    said changeable portion is further reconfigurable between said first mode, said second mode, a third mode, and a fourth mode, said second mode corresponding to activity on the control and data channels according to a quadrature phase shift keying scheme, said third mode corresponding to activity on the control channel according to a quadrature phase shift keying scheme and activity on the data channel according to 16-ary quadrature amplitude modulation, said fourth mode corresponding to an idle state.

2. A communication circuit operable with a data channel and a control channel, said communication circuit comprising:
    a changeable portion reconfigurable between a first mode associated with activity on the control channel only and a second mode associated with activity on both the data channel and the control channel, said first mode being selected for reduced power consumption compared to said second mode; and
    controller circuitry coupled to said changeable portion and configured to: (i) sense signals associated with the control channel to determine an appropriate configuration of said changeable portion corresponding to one of said first and second modes, and (ii) switch said changeable portion between said first and second modes;
    wherein:
    said controller circuitry comprises:
        a control channel module configured to sense the signals associated with the control channel to determine said appropriate configuration of said changeable portion corresponding to said one of said first and second modes; and
        a changeable portion controller coupled to said changeable portion and said control channel module, said changeable portion controller being configured to switch said changeable portion between said first and second modes responsive to input from said control channel module;
    said communication circuit comprises a receiver circuit;
    said changeable portion comprises an equalizer filter, and
    said changeable portion controller comprises an equalizer control;
    said control channel module comprises a control channel decoder;
    said communication circuit further comprising:
        a data channel decoder;
        a despreader/demapper coupled to said equalizer filter, said control channel decoder, and said data channel decoder; and
        a control and timing module coupled to said equalizer control; and
    wherein said equalizer control comprises:
        a terminal state machine configured to determine an appropriate one of said modes for said equalizer filter, responsive to said input from said control channel decoder; and
        a parameter determination module configured to generate filter parameters for said equalizer filter, responsive to information indicative of state received from said terminal state machine.

3. The communication circuit of claim 2, wherein said parameter determination module comprises a parameter look up table having appropriate values of parameters indicative of sample shift control, weight bit width, weight control update, tap length, tap spacing, and output shift control corresponding to said first and second modes.

4. The communication circuit of claim 3, wherein said equalizer filter comprises:
    sample bit logic configured to receive said parameter indicative of sample shift control from said parameter determination module;
    an equalizer delay line having an input coupled to said sample bit logic and having a plurality of weighted taps with tap weights;
    tap enable logic coupled to said taps of said equalizer delay line and configured to receive said parameters indicative of tap length and tap spacing from said parameter determination module;
    weight buffer and update logic coupled to said taps of said equalizer delay line and configured to receive said parameters indicative of weight bit width, weight control update, tap length, and tap spacing from said parameter determination module;
    a first adder coupled to a first portion of said taps and a second adder coupled to a second portion of said taps; and output bit logic having an output coupled to said weight buffer and update logic and being configured to receive said parameter indicative of output shift control from said parameter determination module, said output bit logic having an input selectively interconnected to said first and second adders.

5. The communication circuit of claim 4, wherein said weight buffer and update logic comprises:
weight update logic configured to receive said parameters indicative of weight bit width, weight control update, tap length, and tap spacing from said parameter determination module, said weight update logic being coupled to said output of said output bit logic;
a weight buffer memory coupled to said weight update logic and configured to contain values of said tap weights; and
a weight multiplexer coupled to said weight buffer memory and said weighted taps and configured to distribute said tap weights to said taps.

6. The communication circuit of claim 4, wherein said taps have a first spacing of T/2 and a second spacing of T, and said tap enable logic is configured to specify:
which of said taps are to be enabled, and when said enabling is to be asserted, for said first and second tap spacings;
which of said taps are to be enabled, and when said enabling is to be asserted, when transitioning from said first to said second spacing; and
which of said taps are to be enabled, and when said enabling is to be asserted, when transitioning from said second to said first spacing.

7. The communication circuit of claim 6, wherein said equalizer filter comprises a delay line with a plurality of weighted taps, said equalizer filter having an output and being reconfigurable via: (i) adjustment of weights of said weighted taps, and (ii) selection of appropriate ones of said weighted taps to be coupled to said output.

8. A communication circuit operable with a data channel and a control channel, said communication circuit comprising:
a changeable portion reconfigurable between a first mode associated with activity on the control channel only and a second mode associated with activity on both the data channel and the control channel, said first mode being selected for reduced power consumption compared to said second mode; and
controller circuitry coupled to said changeable portion and configured to: (i) sense signals associated with the control channel to determine an appropriate configuration of said changeable portion corresponding to one of said first and second modes, and (ii) switch said changeable portion between said first and second modes;
wherein:
said controller circuitry comprises:
a control channel module configured to sense the signals associated with the control channel to determine said appropriate configuration of said changeable portion corresponding to said one of said first and second modes; and
a changeable portion controller coupled to said changeable portion and said control channel module, said changeable portion controller being configured to switch said changeable portion between said first and second modes responsive to input from said control channel module;
said circuit comprises a receiver circuit;
said changeable portion comprises at least one of a despreader and a demapper; and
said changeable portion comprises:
a control channel despreader configured to be operable in said first and second modes;
a control channel demapper configured to be operable in said first and second modes and coupled to said control channel despreader and said control channel module;
a data channel despreader configured to be operable in said second mode and idle in said first mode; and
a data channel demapper configured to be operable in said second mode and idle in said first mode and coupled to said data channel despreader;
wherein each of said control channel despreader, said control channel demapper, said data channel despreader and said data channel demapper are coupled to said changeable portion controller.

9. A communication circuit operable with a data channel and a control channel, said communication circuit comprising:
a changeable portion reconfigurable between a first mode associated with activity on the control channel only and a second mode associated with activity on both the data channel and the control channel, said first mode being selected for reduced power consumption compared to said second mode; and
controller circuitry coupled to said changeable portion and configured to: (i) sense signals associated with the control channel to determine an appropriate configuration of said changeable portion corresponding to one of said first and second modes, and (ii) switch said changeable portion between said first and second modes;
wherein:
said changeable portion comprises an equalizer filter;
said equalizer filter comprises a delay line with a plurality of weighted taps, said equalizer filter having an output and being reconfigurable via: (i) adjustment of weights of said weighted taps, and (ii) selection of appropriate ones of said weighted taps to be coupled to said output; and
said controller circuitry switches said equalizer filter between said first and second modes by said adjustment of said weights of said weighted taps and said selection of said appropriate ones of said weighted taps to be coupled to said output.

10. The communication circuit of claim 9, wherein said controller circuitry comprises:
a control channel module configured to sense the signals associated with the control channel to determine said appropriate configuration of said changeable portion corresponding to said one of said first and second modes; and
a changeable portion controller coupled to said changeable portion and said control channel module, said changeable portion controller being configured to switch said changeable portion between said first and second modes responsive to input from said control channel module.

11. The communication circuit of claim 10, wherein said communication circuit comprises a receiver circuit and said changeable portion controller comprises an equalizer control.

12. The communication circuit of claim 11, wherein the data channel comprises a High Speed Physical Data Shared Channel and the control channel comprises a High Speed Shared Control Channel.

13. The communication circuit of claim 11 wherein the data channel comprises a Secondary Common Control Physical Channel containing a Paging Channel and the control channel comprises a Paging indicator channel.

14. The communication circuit of claim 11, wherein said control channel module is configured to anticipate which of said first and second modes will be required in a future time.

15. The communication circuit of claim 11, wherein said control channel module comprises a control channel decoder, said communication circuit further comprising:
   a data channel decoder;
   a despreader/demapper coupled to said equalizer filter, said control channel decoder, and said data channel decoder; and
   a control and timing module coupled to said equalizer control.

16. The communication circuit of claim 10, wherein said circuit comprises a receiver circuit and said changeable portion comprises at least one of a despreader and a demapper.

17. The communication circuit of claim 9, further comprising an antenna module coupled to said changeable portion.

18. An integrated circuit operable with a data channel, a control channel, and a processor, said integrated circuit comprising:
   a changeable portion reconfigurable between a first mode associated with activity on the control channel only and a second mode associated with activity on both the data channel and the control channel, said first mode being selected for reduced power consumption compared to said second mode;
   a control channel module configured to sense signals associated with the control channel to determine an appropriate configuration of said changeable portion corresponding to one of said first and second modes; and
   a changeable portion control interface coupled to said changeable portion and said control channel module, and configured for interconnection with the processor, said changeable portion control interface being further configured to switch said changeable portion between said first and second modes responsive to input from said control channel module and the processor;

wherein:
   said changeable portion comprises an equalizer filter;
   said equalizer filter comprises a delay line with a plurality of weighted taps, said equalizer filter having an output and being reconfigurable via: (i) adjustment of weights of said weighted taps, and (ii) selection of appropriate ones of said weighted taps to be coupled to said output; and
   said changeable portion control interface switches said equalizer filter between said first and second modes by said adjustment of said weights of said weighted taps and said selection of said appropriate ones of said weighted taps to be coupled to said output.

19. The integrated circuit of claim 18, wherein the processor is an external processor that is not part of said integrated circuit.

20. The integrated circuit of claim 18, wherein the processor is formed as part of said integrated circuit.

21. A method of operating a communication circuit comprising the steps of:
   operating said circuit in a first mode wherein activity is limited to a control channel and a changeable portion of said circuit is configured for reduced power consumption as compared to a second mode;
   obtaining a signal from said control channel indicative of activity associated with a data channel; and
   responsive to said obtaining of said signal, reconfiguring said changeable portion of said circuit into said second mode, said second mode being associated with activity on both said data channel and said control channel;
wherein:
   said changeable portion comprises an equalizer filter, said equalizer filter in turn comprising a delay line with a plurality of weighted taps, said equalizer filter having an output and being reconfigurable via: (i) adjustment of weights of said weighted taps, and (ii) selection of appropriate ones of said weighted taps to be coupled to said output; and
   said reconfiguring step comprises adjusting of said weights of said weighted taps and selecting of said appropriate ones of said weighted taps to be coupled to said output.

* * * * *